May 7, 1968

H. L. McDERMOTT 3,381,498

TORQUE TRANSMITTING DRIVE

Filed May 18, 1966

INVENTOR.
HUGH L. McDERMOTT
BY
Wayne B. Easton
ATTORNEY

May 7, 1968  H. L. McDERMOTT  3,381,498
TORQUE TRANSMITTING DRIVE
Filed May 18, 1966  2 Sheets-Sheet 2
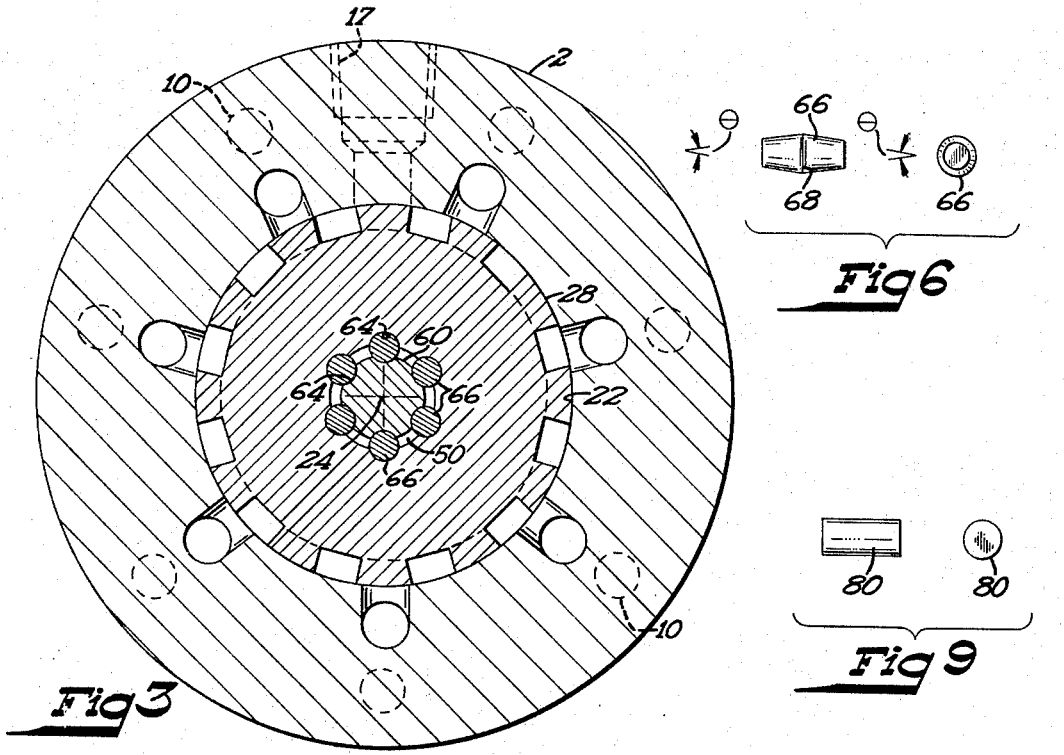
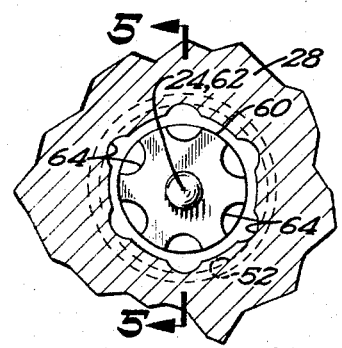
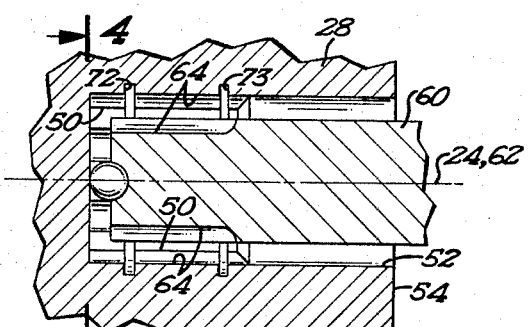
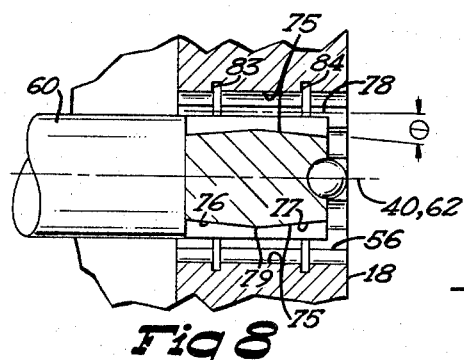
INVENTOR.
HUGH L. McDERMOTT
BY Wayne B. Easton
ATTORNEY United States Patent Office 3,381,498
Patented May 7, 1968

3,381,498
TORQUE TRANSMITTING DRIVE
Hugh L. McDermott, Minneapolis, Minn., assignor to Char-Lynn Company, Eden Prairie, Minn., a corporation of Minnesota
Filed May 18, 1966, Ser. No. 550,985
5 Claims. (Cl. 64—8)

ABSTRACT OF THE DISCLOSURE

A torque transmitting mechanism to provide for the transmitting of torque between a shaft member and a first rotatable member connected to one end of the shaft member, the other end of the shaft member being connected to a second rotatable member, one of the first and second members adapted for eccentric movement relative to the other of the members.

---

This invention relates to a torque transmitting drive for transmitting torque between a first member which may be rotatable or stationary and a second member which is eccentrically disposed a fixed distance relative to said first member and is capable of rotational movement in synchronism with the first member and/or orbital movement relative to said first member.

A prior art form to torque drive is shown in U.S. Reissue Patent 25,126 in which there is disclosed a shaft embodied in a fluid pressure motor which functions to transmit torque between two relatively orbitable members which are required to rotate in synchronism and which have their axes spaced apart a fixed distance. The shaft of this prior art drive is provided with a specially formed set of gear teeth at one end thereof which cooperate with splines in the member having orbitable movement to facilitate a universal joint type of action and specialized gear cutting equipment is required for cutting and forming the gear teeth. Although the prior art shaft is capable of functioning as a universal joint, that capability is greater than is actually required because the axes of the two members connected by the shaft are spaced apart a fixed distance and thus the wide range of angular movement which a universal joint can accommodate is not required in that drive mechanism. Also characteristic of the prior art drive is that there is present a sliding engagement between the meshing teeth thereof which is accompanied by frictional losses and wear.

The torque drive of the present invention is especially adapted for embodiment in a device such as a fluid pressure motor which has two rotatable members whose axes are spaced apart a fixed distance. The fixed distance between the axes is concomitant with the axis of the shaft intersecting the axes of the rotatable members at fixed angles which are equal to each other and this characteristic is the basis for the present invention. The torque drive of the present invention has cooperating recesses between driving and driven members which form articulated holes between the members and small torque transmitting elements are disposed respectively in said articulated holes, such elements and holes being shaped and dimensioned in relation to the two fixed angles which the axis of the shaft makes with the axes of the rotatable members.

The advantages of the present invention over the prior art referred to are (1) the articulated holes and the torque transmitting elements are formed inexpensively with conventional machining methods and (2) only rolling action is present between the moveable parts of the drive which creates less friction and wear than does a sliding action.

A main object of the invention is to provide a new and improved torque transmitting drive as described herein.

Other objects and advantages of the invention will become apparent from the following specification, drawings and appended claims.

In the drawings:

FIG. 3 is a sectional view taken on line 3—3 of FIG. 1;

FIG. 4 is a sectional view taken on line 4—4 of FIG. 5 of two parts of the embodiment of the torque drive associated with the left side of the drive shaft in the device of FIG. 1, prior to assembling, which illustrates how these two parts are formed;

FIG. 5 is a longitudinal sectional view taken on line 5—5 of FIG. 4;

FIG. 6 shows front and side views of a torque transmitting element which may be utilized with the embodiment of the invention shown in FIGS. 4 and 5;

FIG. 7 is an end view of two parts of the embodiment of the torque drive associated with the right side of the drive shaft in the device of FIG. 1, prior to assembling, which illustrates how these two parts are formed.

FIG. 8 is a longitudinal sectional view taken on line 8—8 of FIG. 7; and

FIG. 9 shows front and side views of a torque transmitting element which may be utilized with the embodiment of the invention shown in FIGS. 7 and 8.

Figure 1:
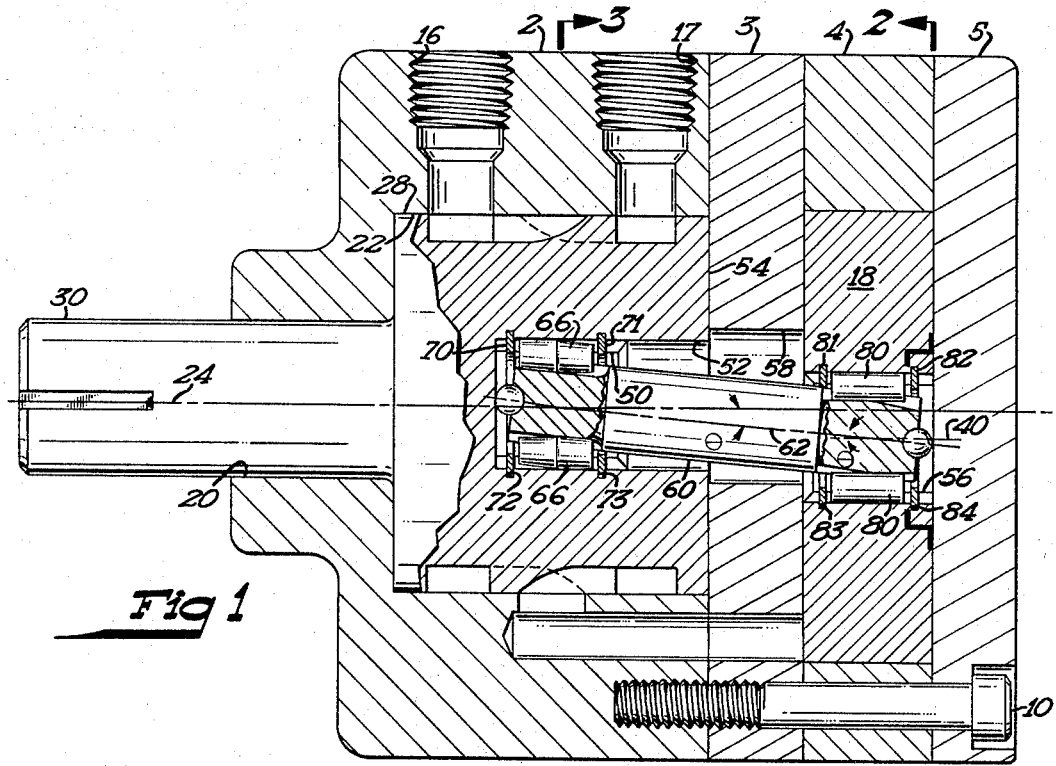
FIG. 1 is a longitudinal view of a fluid pressure device in which two embodiments of the torque transmitting drive of the present invention are incorporated.

The torque transmitting drive of the present invention has general utility and it is only by way of example that it is illustrated herein as being incorporated in a fluid pressure device which may be utilized as a pump or a motor.

In the fluid pressure motor or pump illustrated there is provided a casing or housing made of several cylindrically shaped sections which are a valve casing section 2, a plate section 3, a gerotor casing section 4, and an end cover plate 5. Casing sections 2, 3, 4 and 5 are held together in axial and radial alignment by a plurality of circumferentially spaced bolts 10.

Casing section 2 is provided with inlet and outlet ports 16 and 17 which would be reversed for operation of the pump or motor in the opposite direction.

The shape of gerotor casing section 4 is generally cylindrical and annular and has a plurality of internal teeth. An externally toothed star member 18 having at least one fewer tooth than casing section 4, which may be referred to as a ring member 4, has the teeth thereof in meshing engagement with the teeth of ring member 4. Star member 18 partakes of a hypocycloidal movement and travels in an orbit about the axis of ring member 4.

Valve casing section 2 has an axially extending bore 20 and a counterbore 22, both of which bores are concentric relative to the axis 24 of ring member 4. Inlet and outlet ports 16 and 17 communicate with the interior of bore 22 as shown in FIG. 1. Rotatably disposed in valve casing section 2 is a combination valve and shaft member which comprises a cylindrically shaped valve which is rotatably supported in counterbore 22 and a shaft 30 which is rotatably supported in bore 20.

Shaft 30 is an input shaft if the device is used as a pump and an output shaft if the device is used as a motor.

Figure 2:
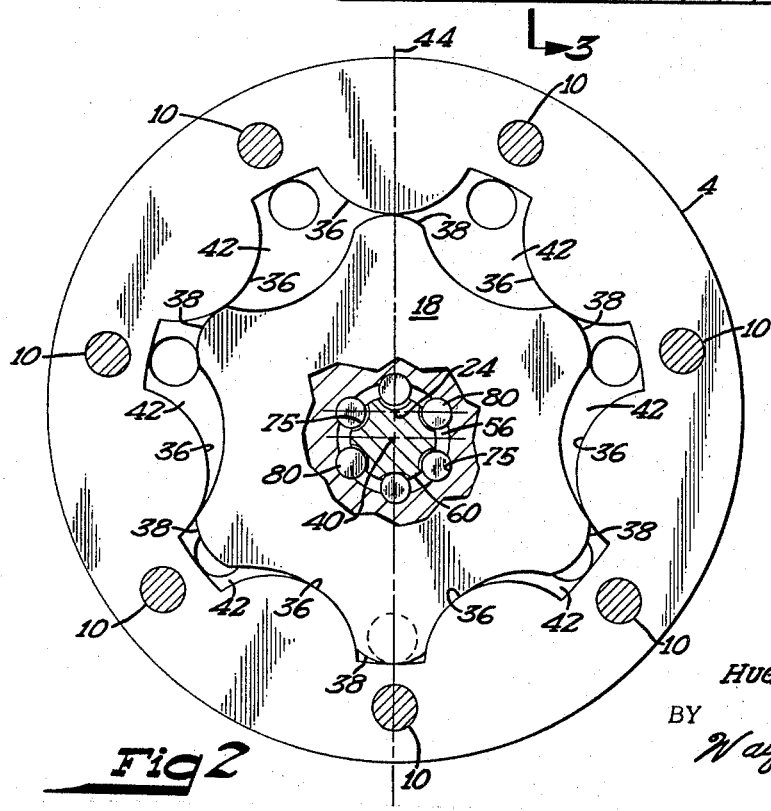
FIG. 2 is a sectional view taken on line 2—2 of FIG. 1.

With reference to FIG. 2, the gerotor casing section 4, which in effect is the ring member 4, has a plurality of internal teeth 36. Externally toothed star member 18, having at least one fewer tooth 38 than ring member 4, is disposed eccentrically in the chamber or space formed and surrounded by ring member 4. Star member 18 is moveable orbitally relative to the ring member 4 with the axis 40 of star member 18 being moveable in an orbital path about the axis 24 of ring member 4. During orbital movement of star member 18 the teeth 38 thereof intermesh with the ring member teeth 36 in sealing engagement to form expanding contracting cells 42 which are equal in number to the number of teeth 38 of star member 18.

With further reference to FIG. 2 a vertical centerline 44 incidentally represents the line of eccentricity for the star member 18 for that particular position of the star member relative to the ring member 4. During orbital movement of the star member 18, and assuming the orbital movement is clockwise, the cells 42 on the right side of the line eccentricity would be expanding and the cells 42 on the left side of the line of eccentricity would be contracting. If the device is used as a motor, fluid under pressure is directed to the expanding cells and exhausted from the contracting cells. If the device is used as a pump, fluid is sucked into the expanding cells and delivered under pressure from the contracting cells.

Valve 28 has a bore 50 and a counterbore 52 adjacent thereto which opens into the radial face 54 of the valve, both bores being concentrically arranged relative to ring axis 24. Star 18 has a bore 56 which is concentrically arranged relative to star axis 40 and casing section 3 has a bore 58 which is concentric relative to the general or main axis 24.

A shaft 60 is disposed in the bores described and extends between and mechanically connects star 18 and valve 28 in driving relation. Shaft 60 has an axis 62 about which the shaft is rotatable and which intersects parallel ring and star axes 24 and 40 to form angles $\theta$ which remain constant and are equal to each other for all orbital positions of the star 18 relative to the ring 4.

In general, slots or recesses are provided in the ends of the shaft 60 and in the bores 50 and 56 of the valve 28 and star 18 which cooperate to form articulated holes into which torque transmitting elements are disposed. The manner in which the recesses or holes which house the torque transmitting elements may be formed is illustrated in FIGS. 4, 5, 7 and 8. During the manufacturing operations fixtures or the like may be utilized so that the axes 24 and 62 of the valve 28 and shaft 60 (FIGS. 4 and 5) are coaxial and so that the axes 40 and 62 of the star 18 and shaft 60 (FIGS. 7 and 8) are coaxial.

The mechanical connection between shaft 60 and valve 28 is illustrated in FIGS. 4 to 6 as well as in FIG. 1. With shaft 60 and valve 28 arranged concentrically as depicted in FIGS. 4 and 5, a circumferentially arranged plurality of articulated holes 64 having cylindrical shapes are formed therebetween which are parallel to the coincident axes 24 and 62. A plurality of torque transmitting elements 66 each comprising two frustoconical portions having a common base or base circle 68 are disposed in the holes 64. The diameters of the base circles 68 of the elements 66 are equal to the diameters of the holes 64 when valve 28 and shaft 60 are arranged coaxially as indicated in FIGS. 4 and 5. The apex angles $\theta$ of each element 66 is equal to angle $\theta$ formed between the shaft axis 62 and the valve axis 24 when shaft 60 is in its installed position as shown in FIG. 1. When the elements 66 are disposed in the holes 64 they are retained in axial alignment relative to the valve 28 by two retainer rings 70 and 71 which are disposed in annular slots 72 and 73 in the valve bore 50.

When shaft 60 is in its inclined position as shown in FIG. 1 such that star 18 is eccentrically disposed in a downwardly direction, the left sides of the elements 66 above the axis 24, and the right sides of the elements 66 below the axis 24, are in line contact with the portions of the holes 64 formed in the valve 28 and shaft 60. The opposite would be true when star 18 is eccentrically disposed in an upwardly direction. Elements 66 are always parallel to each other but the inclination of their axes relative to the axis 24 is constantly changing as the star 18 orbits about axis 24. A line which is perpendicular to the line of eccentricity 44 and passes through the axis 24 denotes a transitional stage for the elements 66 and, as an element 66 passes or crosses this line, it is only the circumference of the base circle 68 of an element 66 that is in contact with the portions of a hole 64 in which the element is disposed. With reference to FIG. 1, the intersection between shaft axis 62 and valve axis 24 is in the vicinity of a point on axis 24 which is midway between the ends of elements 66. That point on axis 24 is the apex of the locus of a cone defined by shaft axis 62 during orbital movement of star 18.

Referring further to the left end of shaft 60, the diameter of shaft 60 is smaller than the diameter of valve bore 50 by an amount which will permit shaft 60 to assume its inclined position without interference between shaft 60 and valve 28. The diameter of shaft 60 could be made larger than illustrated if accompanied by suitable tapering of the end of the shaft 60, or of the valve bore 50, but this would be a modification or detail which would be optional as far as the scope of the invention is concerned.

The mechanical connection between shaft 60 and star 18 is illustrated in FIGS. 7 to 9 as well as in FIG. 1.

The same type of connection disclosed for the left end of the shaft could be used for the right end of the shaft but for convenience a second embodiment of the invention is illustrated for the right end of the shaft.

Each of the holes 75 may be formed by first drilling a cylindrical hole parallel to the coincident axes 40 and 62 which is formed partially in star 18 and partially in shaft 60. The next step would be to modify each hole by forming two adjacent conical surface portions 76 and 77, either in star 18 or shaft 60, which are illustrated by way of example as being formed in the shaft 60. Conical surface portions 76 and 77 of each hole 75 are divergent relative to each other and in effect have a common axis 78 which is coincident with the axis 78 of the cylindrical surface portion of each hole 75 which is formed in star 18. One-half of the apex angle of each conical surface portion 76 and 77 is equal to the angle $\theta$ which is equal to the angle $\theta$ which shaft axis 62 forms with star axis 40 when shaft 60 is in its installed position as shown in FIG. 1. The intersection of each pair of conical surface portions 76 and 77 in shaft 60 forms an arc 79 of a circle having an axis 78 as its center and having a diameter equal to the diameter of the cylindrical surface portion of each of the holes 75 in star 18.

If desired the conical surface portions for holes 75 could be formed in the star 18 and the cylindrical surface portions could be formed in shaft 60. Another alternative would be to form the conical surface portions partially in star 18 and partially in shaft 60 with the axes of the conical surface portions being coincident with the axes 78 and with the apexes of the conical surfaces being equal to the angle $\theta$ which is the angle the shaft axis 62 forms with the star axis 40 as viewed in FIG. 1.

A plurality of cylindrically shaped torque transmitting elements 80 each having a diameter equal to the diameter of the cylindrical surface portion of a hole 75 are disposed in the holes 75. When the elements 80 are disposed in the holes 75 they are retained in axial alignment relative to the star 18 by two retainer rings 81 and 82 which are disposed in annular slots 83 and 84 in the star bore 56.

When shaft 60 is in its inclined position as shown in FIG. 1 such that star 18 is eccentrically disposed in a downwardly direction, the left sides of the elements 80 above the axis 24, and the right sides of the elements 80 below the axis 24, are in line contact with the portions of the holes 75 formed in the star 18 and shaft 60. The opposite would be true when star 18 is eccentrically disposed in an upwardly direction. A line which is perpendicular to the line of eccentricity 44 passes through the axis 24 denotes a transitional stage for the elements 80 and, as an element 80 passes or crosses this line, the element 80 only has line contact with the arc 79 formed on the shaft 60 of a hole 75 in which it is disposed. With reference to FIG. 1, the intersection between shaft axis 62 and star axis 40 is in the vicinity of a point on axis 40 which is midway between the ends of element 80.

Referring further to the right end of shaft 60, the diameter of shaft 60 is smaller than the diameter of star bore 56 by an amount which will permit shaft 60 to assume its inclined position without interference between shaft 60 and star 18. The diameter of shaft 60 could be made larger than illustrated if accompanied by suitable tapering of the end of the shaft 60, or of the star bore 56, but this would be a modification or detail which would be optional as far as the scope of the invention is concerned.

Star member 18 is eccentrically disposed relative to ring member 4, as mentioned above, and the shaft 60 is thus always in a cocked or tilted position relative to star 18 and valve 28. In operation a star member 18 having six teeth will make one revolution about its own axis 40 for every six times the star orbits in the opposite direction about the axis 24 of the ring member 4. Thus, the right end of shaft 60 has both orbital and rotational movement in common with the star member 18 while the left end of the shaft 60 has only rotational movement in common with valve 28.

When the fluid pressure device is utilized as a pump, star 18 will be gyrated and rotated by a turning force applied to shaft 30 which is transmitted to star 18 through valve 28 and shaft 60. When the fluid pressure device is used as a motor, the force created by the gyration and rotation of star member 18 will be transmitted through shaft 60 to valve 28 and shaft 30 to cause turning of shaft 30.

The torque transmitting drive of the present invention has general utility and its incorporation in a gerotor mechanism which comprise a ring member 4 and a star member 18 having orbital movement relative to the ring member only illustrates one application of the invention.

Referring now to the fluid flow attributes of the illustrated fluid pressure device, valve 28 and casing sections 2 and 3 are provided with fluid passages through which fluid is conveyed from the port 16 or 17 to the cells 42 of the gerotor and returned to the other of the ports 16 or 17. Port 16 or 17 will be the inlet, and the other the outlet port, depending on the direction of rotation desired for shaft 30.

During orbiting of star 18 about ring member axis 24, the star rotates in the opposite direction about its own axis 40 at a slower speed. The ratio between the orbiting and rotating speeds is dependent upon the ratio between the ring and star member teeth. If that ratio is seven to six as illustrated herein, the rotating speed of the star will be one-sixth of its orbiting speed. By reason of the shaft connection between star 18 and valve 28, valve 28 rotates at the same speed and in the same direction as star 18. Valve 28 is a known type of commutating valve which rotates at the same speed that star 18 rotates but functions to supply and exhaust fluid to and from the gerotor at the orbiting frequency of the star.

While two embodiments of the invention are described here, it will be understood that the invention is capable of further modifications and that such modifications may be made without departure from the spirit and scope of the invention as defined in the claims. Another or equivalent embodiment of the invention, for example, would be to substitute balls for the conical elements 66 or the cylindrical elements 80.

What I claim is:

1. A torque transmitting mechanism comprising a first member which is rotatable about a first axis, a second member which is rotatable about a second axis which is eccentrically disposed relative to said first axis, a shaft member having an axis which intersects and forms a predetermined angle with each of said first and second axes, a plurality of articulated holes, each comprising two frusto-conically shaped surface portions which are divergent away from each other and which intersect to define a circular arc having a predetermined radius formed in said shaft member and similarly shaped surface portions formed in said first member, and a plurality of torque transmitting elements each having two frustoconically shaped surface portions having a common base which is substantially equal in diameter to the diameters of said holes, said torque transmitting elements disposed in said holes and having engagement with said frustoconically shaped surface portions of said holes whereby one-half of the apex angle of said frustoconically shaped hole and the apex angle of the frustoconically shaped torque transmitting element are substantiatlly equal to said predetermined angle between said shaft member and said first member thereby providing for the transmission of torque between said shaft member and said first member.

2. A torque transmiting mechanism comprising a first member which is rotatable about a first axis, a second member which is rotatable about a second axis which is eccentrically disposed relative to said first axis, a shaft member having an axis which intersects and forms a predetermined angle with each of said first and second axes, a plurality of articulated holes parallel to said first and second axes which said first and second members are arranged in coaxial relation to each other, with each hole having cylindrically shaped surface portions formed in said shaft member and cylindrically shaped surface portions formed in said first member, and a plurality of torque transmitting elements each having two frustoconically shaped surface portions having a common base which is substantially equal in diameter to the diameters of said holes, said torque transmitting elements disposed in said holes and having engagement with said cylindrically shaped surface portions of said holes to provide for the transmitting of torque between said shaft member and said first member.

3. A torque transmitting mechanism according to claim 2, wherein said frustoconically shaped torque transmitting elements have apex angles which are substantially equal to said predetermined angle.

4. A torque transmitting mechanism comprising a first member which is rotatable about a first axis, a second member which is rotatable about a second axis which is eccentrically disposed relative to said first axis, a shaft member having an axis which intersects and forms a predetermined angle with each of said first and second axes, a plurality of articulated holes, each comprising two frustoconically shaped surface portions which are divergent away from each other and which intersect to define a circular arc having a predetermined radius formed in said shaft member and similarly shaped surface portions formed in said first member, and a plurality of cylindrically shaped torque transmitting elements each having a radius substantially equal to the radius of the circular arcs defined by the intersection of said frustoconically shaped surface portions, said torque transmitting elements disposed in said holes and having engagement with said surface portions of said holes to provide for the transmitting of torque between said shaft member and said first member.

5. A torque transmitting mechanism according to claim 4, wherein said frustoconically shaped portions have apex angles which are substantially equal to two times said predetermined angle.

References Cited

UNITED STATES PATENTS

| | | | |
|---|---|---|---|
| 1,220,483 | 3/1917 | Williams et al. | 64—9 X |
| 1,450,805 | 4/1923 | Hart-Spratt | 64—9 |
| 1,463,306 | 7/1923 | Bushnell | 64—7 |
| 1,936,574 | 11/1933 | Banner | 64—9 |
| 2,147,491 | 2/1939 | Le Bus | 64—7 |
| 2,375,030 | 5/1945 | O'Malley | 64—8 |
| 2,902,844 | 9/1959 | Rzeppa | 64—21 |
| 3,309,999 | 4/1967 | Patterson | 103—130 |

FOREIGN PATENTS 1,342,906  10/1963  France.

MARTIN P. SCHWADRON, *Primary Examiner.*

G. N. BAUM, *Assistant Examiner.*